United States Patent [19]

Fernstrom

[11] Patent Number: 4,932,430
[45] Date of Patent: Jun. 12, 1990

[54] ADJUSTABLE TWO-STAGE FLUID PRESSURE REGULATING VALVE

[75] Inventor: Carl F. Fernstrom, St. Louis County, Mo.

[73] Assignee: Emerson Electric Co., St. Louis, Mo.

[21] Appl. No.: 386,354

[22] Filed: Jul. 28, 1989

[51] Int. Cl.$^5$ .................... G05D 16/20; F16K 31/02
[52] U.S. Cl. .................... 137/85; 251/129.18; 251/129.17; 251/129.08
[58] Field of Search .............. 137/85, 82; 251/285, 251/129.08, 129.17, 129.18

[56] References Cited

U.S. PATENT DOCUMENTS

| | | | |
|---|---|---|---|
| 3,843,049 | 10/1974 | Baysinger | 236/1 E |
| 4,605,197 | 8/1986 | Casey | 251/129.17 X |
| 4,637,429 | 1/1987 | Dietiker et al. | 137/505.14 |
| 4,785,846 | 11/1988 | Kragten | 137/489 |
| 4,793,373 | 12/1988 | Mubsold | 251/129.18 X |

Primary Examiner—Alan Cohan
Attorney, Agent, or Firm—Paul A. Becker, Sr.

[57] ABSTRACT

A solenoid operated fluid pressure regulating valve includes a valve responsive to outlet pressure to control the rate of fluid flow to a burner. The valve is biased to a first position to effect a low fire fluid flow rate and to a second position to effect a high fire fluid flow rate. The first and second positions are independently adjustable so as to enable independent field adjustment of the low and high fire fluid flow rates. Lower and upper limits to such field adjustments are established in the assembly of the valve.

7 Claims, 4 Drawing Sheets

ADJUSTABLE TWO-STAGE FLUID PRESSURE REGULATING VALVE

BACKGROUND OF THE INVENTION

This invention relates to solenoid operated fluid pressure regulating valves for providing two-stage burner operation.

It is known in the prior art to provide a solenoid operated fluid pressure regulating valve which enables a low fire and a high fire (two-stage) burner operation. It is also known to provide means for adjusting the values of the fluid pressures to be maintained during such low fire and high fire operation. While such adjusting means are disclosed, they do not appear to be readily accessible so as to facilitate field adjustment of the low fire and high fire pressure values. Also, such adjusting means do not appear to limit, to some pre-established values, the values to which the low fire and high fire pressures can be field adjusted.

SUMMARY OF THE INVENTION

It is, therefore, a primary object of the invention to provide a generally new and improved solenoid operated fluid pressure regulating valve for providing two-stage burner operation.

In the preferred embodiment, a solenoid operated fluid pressure regulating valve includes a valve biased to a first position to effect a low fire fluid flow rate and to a second position to effect a high fire fluid flow rate. The first and second positions are independently adjustable so as to enable independent field adjustment of the low and high fire fluid flow rates. Lower and upper limits to such field adjustments are established in the assembly of the valve.

The above mentioned and other objects and features of the present invention will become apparent from the following description when read in conjunction with the accompanying drawings.

DESCRIPTION OF THE PREFERRED EMBODIMENT

Figure 1:
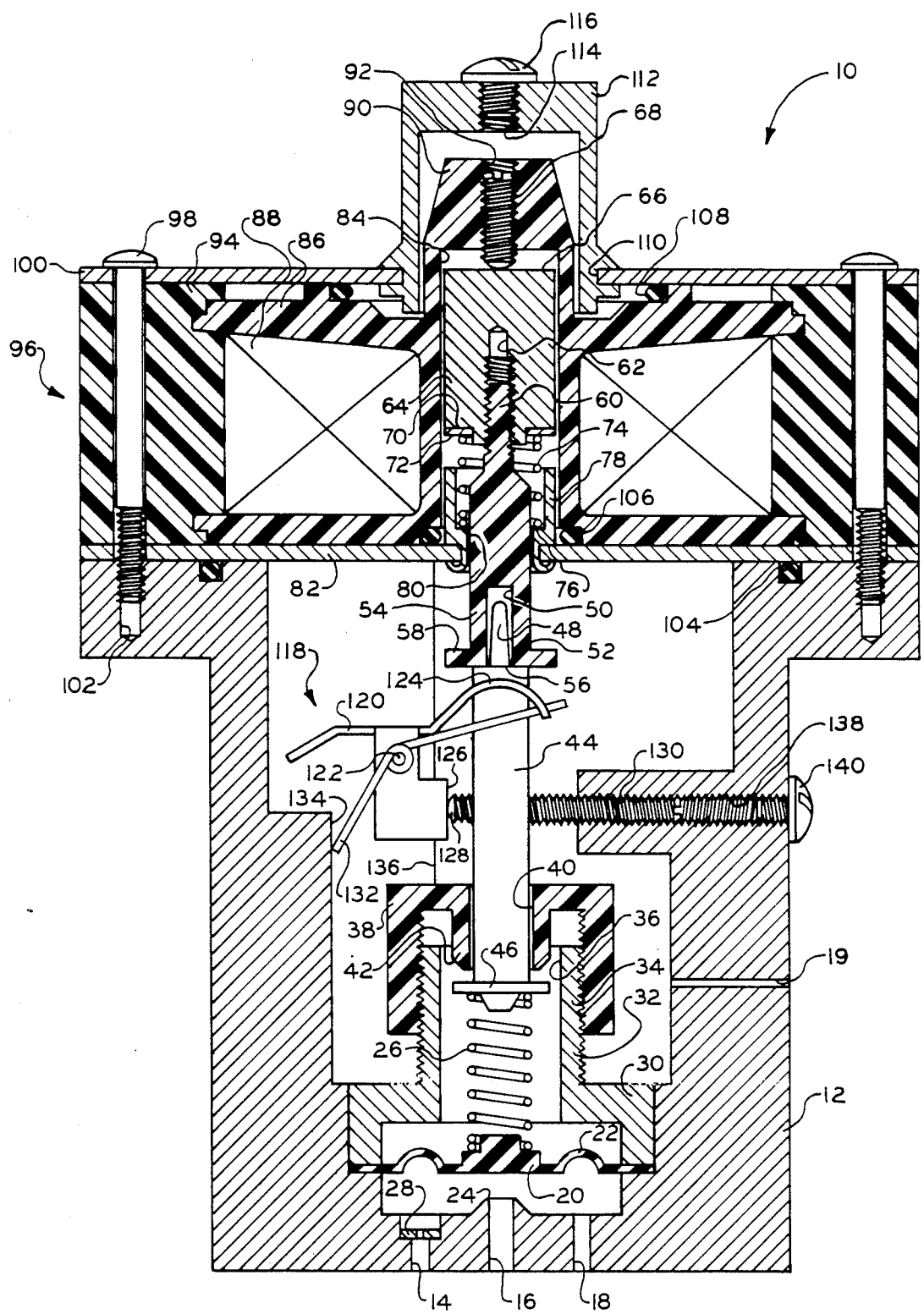
FIG. 1 is a cross-sectional view of the pressure regulating valve of the present invention shown with the valve in the low fire condition.

Referring to FIG. 1, pressure regulating valve 10 includes a valve body 12 having inlet passages 14 and 16, an outlet passage 18, and a vent passage 19 to the atmosphere. A valve 20, formed as an integral portion of a flexible diaphragm 22, cooperates with a valve seat 24 formed at one end of inlet passage 16 to control the fluid flow from inlet passage 16. A spring 26 biases valve 20 downwardly toward seat 24.

Valve 10 is adaptable for use as the pressure regulating valve in a gas flow arrangement of the type wherein inlet passages 14 and 16 function as bleed-off passages of control gas which is effective to regulate the opening of a main valve, and wherein outlet passage 18 is connected to an area downstream of the main valve at which the outlet pressure is to be controlled. Such as gas flow arrangement is typified in U.S. Pat. No. 3,843,049. In conjunction with such a gas flow arrangement, if the outlet pressure decreases, the upward force on diaphragm 22 decreases. Spring 26 then biases valve 20 closer to valve seat 24 which decreases the amount of bleed-off from inlet passage 16. The reduced bleed-off enables the main valve to open wider which effects an increase in the outlet pressure. Conversely, if the outlet pressure increases, the upward force on diaphragm 22 increases, causing valve 20 to move further away from valve seat 24 which increases the amount of bleed-off from inlet passage 16. The increased bleed-off causes the main valve to open less which effects a decrease in the outlet pressure. Inlet passage 14, having a restricting orifice 28, provides a constant bleed-off means to ensure proper closing of the main valve.

Diaphragm 22 is clamped at its periphery between body 12 and the lower portion 30 of a screw member 32. Screw member 32 further includes an upper portion 34 having external threads and an axial bore 36 therethrough. A cup-shaped adjustment nut 38 having an axial bore 40 is threadedly engaged to screw member 32. Nut 38 further includes a shank portion 42 which extends downwardly within axial bore 36 of screw member 32.

A stud 44 having a lower headed portion 46 and an upper reduced diameter portion 48 extends through axial bore 40 of nut 38. Spring 26 bears against the underside of lower headed portion 46. The opposite side of lower headed portion 46 is cooperative with shank portion 42 of nut 38 to provide a low limit value of pressure adjustment as will hereinafter be described. The upper reduced diameter portion 48 of stud 44 extends into a circular bore 50 formed in the lower portion 52 of a screw member 54. Under normal conditions, stud 44 is biased upwardly by spring 26 so that the shoulder portion 56 of stud 44, from which the upper reduced diameter portion 48 extends upwardly, is in contact with an outwardly extending flange 58 in the lower portion 52 of screw member 54.

The upper portion 60 of screw member 54 is of reduced diameter and is threadedly engaged in a threaded bore 62 of a plunger 64. The upper surface 66 of plunger 64 is cooperative with an adjustment screw 68. The lower surface 70 of plunger 64 is provided with a brass washer 72. A spring 74 is interposed between washer 72 and an inwardly extending shoulder portion 76 of a core member 78. Washer 72 is effective to prevent sticking of plunger 64 to core member 78 due to residual magnetism. Spring 74 biases plunger 64 upwardly against adjustment screw 68. Core member 78 has an axial bore 80 through which screw member 54 extends. Core member 78 is securely fixed, such as by coining, to a lower cover plate 82.

Plunger 64 is slidably received in an axial bore 84 of a winding bobbin 86 on which is wound a wire coil 88 of an appropriate number of turns of wire. Bobbin 86 is provided with a centrally raised boss 90 having an axial bore 92 into which adjustment screw 68, which is a thread-forming screw, is received. A rigid potting compound 94 encapsulates the portions of coil 88 that are not enclosed by bobbin 86 and provides a rigid one-piece coil assembly, indicated generally at 96, of bobbin 86, coil 88, and potting compound 94.

Coil assembly 96 is securely attached to valve body 12 by means of screws 98 which extend through an upper cover plate 100, coil assembly 96, and a lower cover plate 82 into threaded bores 102 in valve body 12. O-ring 104 between valve body 12 and lower cover plate 82, O-ring 106 between bobbin 86 and lower cover plate 82, and O-ring 108 between bobbin 86 and upper cover plate 100 are provided to protect against uncontrolled gas leakage to the atmosphere in the event that diaphragm 22 should rupture.

Upper cover plate 100 is provided with a central opening 110 to which a cap member 112 is secured such as by coining. Cap member 112 is provided with a central threaded opening 114 which receives a screw 116. As will hereinafter be described, screw 116 is removable so as to enable field adjustment of adjustment screw 68. Screw 116 is of a type which provides a metal-to-metal seal with cap member 112 so as to protect against gas leakage.

As will hereinafter be described more completely, when coil 88 is electrically energized, plunger 64 is pulled downwardly so as to increase the biasing force of spring 26 on valve 20. The amount of downward movement of plunger 64, and thus the value of the biasing force of spring 26 on valve 20, is determined in part by a lever assembly indicated generally at 118.

Lever assembly 118 comprises a lever 120 pivotally attached to valve body 12 at 122. Lever 120 includes a forked end 124 through which stud 44 freely extends, and an edge portion 126 which is biased against the tip portion 128 of an adjustment screw 130 by a wire spring 132. Spring 132 is mounted at pivot 122 and bears against an inside wall surface 134 of valve body 12 and forked end 124 of lever 120 to provide a strong counterclockwise bias on lever 120.

When plunger 64 is pulled downwardly, screw member 54 is also pulled downwardly causing the underside of flange 58 to contact forked end 124 of lever 120. Upon such contact, the strong counterclockwise bias on lever 120 prevents further downward movement of screw member 54. Since spring 26 biases stud 44 upwardly, causing shoulder portion 56 of stud 44 to be in contact with flange 58 of screw member 54, contact of the underside of flange 58 with forked end 124 of lever 120 also prevents further downward movement of stud 44. The amount of downward movement of screw member 54 is adjustable by means of adjustment screw 130. Specifically, turning in adjustment screw 130 causes lever 120 to pivot clockwise thus allowing more downward movement of screw member 54; backing out adjustment screw 130 enables lever 120 to pivot counterclockwise, due to the bias of spring 132, thus allowing less downward movement of screw member 54. The amount that adjustment screw 130 can be turned in is limited by an abutment 136 in an interior wall of valve body 12. Specifically, when the tip portion 128 of adjustment screw 130 contacts the abutment 136, further turning in of adjustment screw 130 is prevented. Such a limitation on further turning in of adjustment screw 130 prevents distortion of lever 120.

Adjustment screw 130 is threadedly engaged in a threaded bore 138 in valve body 12. A screw 140 is also received in bore 138 and provides a metal-to-metal seal with body 12 to protect against gas leakage. As will hereinafter be described, screw 140 is removable so as to enable field adjustment of adjustment screw 130.

Pressure regulating valve 10 is adapted to regulate outlet pressure so as to provide a low fire and a high fire (two-stage) burner operation.

Illustrated in FIG. 1 is the condition of valve 10 when the burner is operated at low fire. Specifically, coil 88 is de-energized so that plunger 64 is biased by spring 74 against adjustment nut 68. Spring 26 biases stud 44 upwardly against screw member 54 and biases valve 20 downwardly towards seat 24. In such a low fire condition, valve 10 is effective to maintain an outlet pressure of, for example, 1.6 inches (water column). If it is desired to adjust the value of outlet pressure to be maintained during low fire, screw 116 is removed whereby adjustment screw 68 is accessible. Adjustment screw 68 can then be turned in, which causes spring 26 to provide increased bias to valve 20 thereby increasing the low fire pressure setting. Alternatively, adjustment screw 68 can be backed out, which reduces the bias of spring 26 on valve 20 thereby decreasing the low fire pressure setting.

Figure 2:
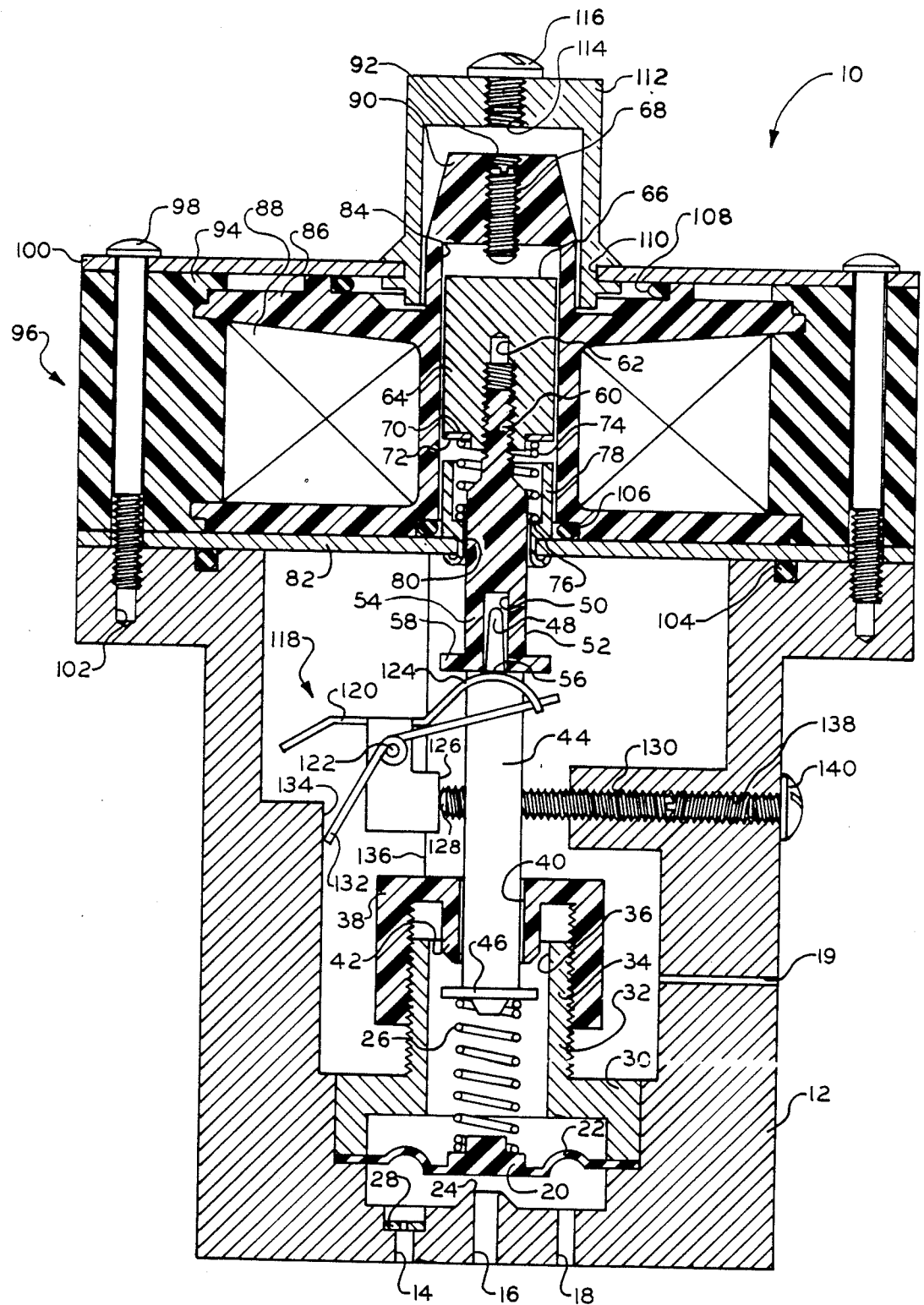
FIG. 2 is a cross-sectional view of the valve shown with the valve in the high fire condition.

Illustrated in FIG. 2 is the condition of valve 10 when the burner is operated at high fire. Specifically, coil 88 is energized so that plunger 64 is pulled downwardly to the point where the underside of flange 58 of screw member 54 contacts forked end 124 of lever 120. Spring 26 biases stud 44 upwardly against screw member 54 and biases valve 20 downwardly towards seat 20. In such a high fire condition, valve 10 is effective to maintain an outlet pressure of, for example, 3.5 inches. If it is desired to adjust the value of outlet pressure to be maintained during high fire, screw 140 is removed whereby adjustment screw 130 is accessible. Adjustment screw 130 can then be turned in, which causes lever 120 to pivot clockwise to enable further downward movement of screw member 54 and thus stud 44 so as to increase the bias of spring 26 on valve 20 thereby increasing the high fire pressure setting, or it can be backed out, which causes lever 120 to pivot counterclockwise to reduce the downward movement of screw member 54 and thus stud 44 so as to reduce the bias of spring 26 on valve 20 thereby decreasing the high fire pressure setting.

The construction of valve 10 also provides lower and upper limits to the described independent adjustments of the low fire and high fire pressure settings.

Figure 3:
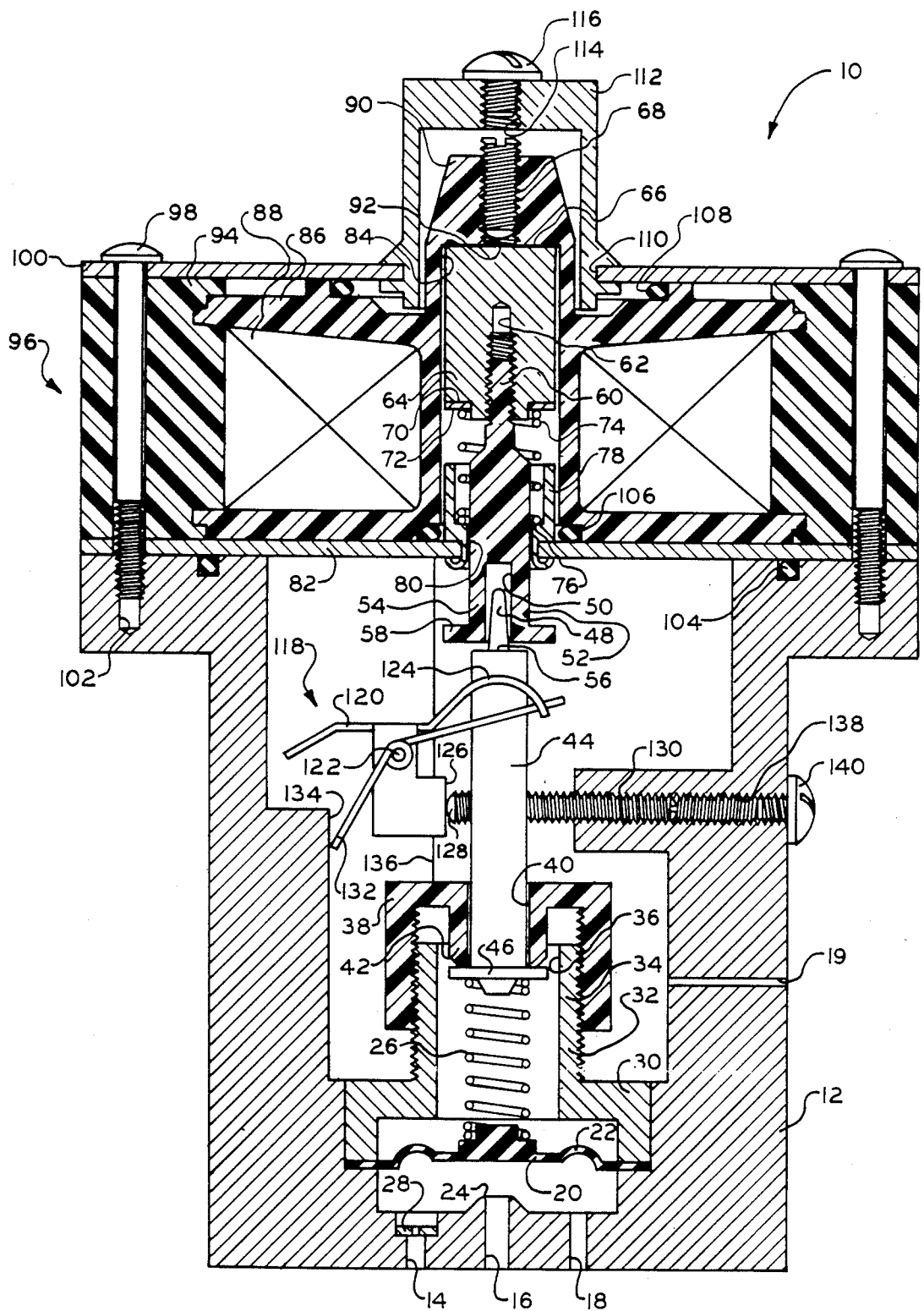
FIG. 3 is a cross-sectional view of the valve shown with the valve at the lowest possible pressure setting.

Specifically, referring to FIG. 3, the lowest possible pressure setting exists when headed portion 46 of stud 44 is in contact with shank portion 42 of nut 38. Under this condition, spring 26 exerts the least possible bias on valve 20. The value of the lowest possible pressure setting is established in the assembly of valve 10. Specifically, with only the orifice 28, diaphragm 22, spring 26, screw member 32, nut 38, and stud 44 assembled in valve body 12, nut 38 is adjusted with respect to screw member 32 until the outlet pressure is at a desired value, for example, 1.0 inch, for the lowest possible pressure setting. Since the headed portion 46 of stud 44 is in contact with shank portion 42 of nut 38 during this adjustment, due to the bias of spring 26, valve 10 will subsequently maintain such a lowest pressure setting whenever such contact is effected.

This lowest possible pressure setting is subsequently attainable in the process of field adjustment by backing out adjustment screw 68, with coil 88 de-energized, until contact of headed portion 46 of stud 44 and shank portion 42 of nut 38 occurs. It is to be noted, as illustrated in FIG. 3, that even if adjustment screw 68 is backed out an amount sufficient to enable plunger 64 to be in its uppermost position wherein its upper surface 66 is in contact with the underside of boss 90 of the bobbin 66, stud 44 is prevented from further upward movement. As illustrated in FIG. 3, any additional upward movement of plunger 64 subsequent to contact of headed portion 46 of stud 44 with shank portion 42 of nut 38 causes flange 58 of screw member 54 to move upwardly and way from shoulder portion 56 of stud 44. Since stud 44 is prevented from further upward movement by shank portion 42 of nut 38, such additional upward movement of plunger 64 has no effect on the pressure setting.

The provision of a lower limit to field adjustment of the low fire pressure setting ensures that the resulting low fire flow rate of gas to the burner will be sufficient so as to ensure that a burner flame will be established and that there will be no sooting and no "burning back" at the burner orifice.

Figure 4:
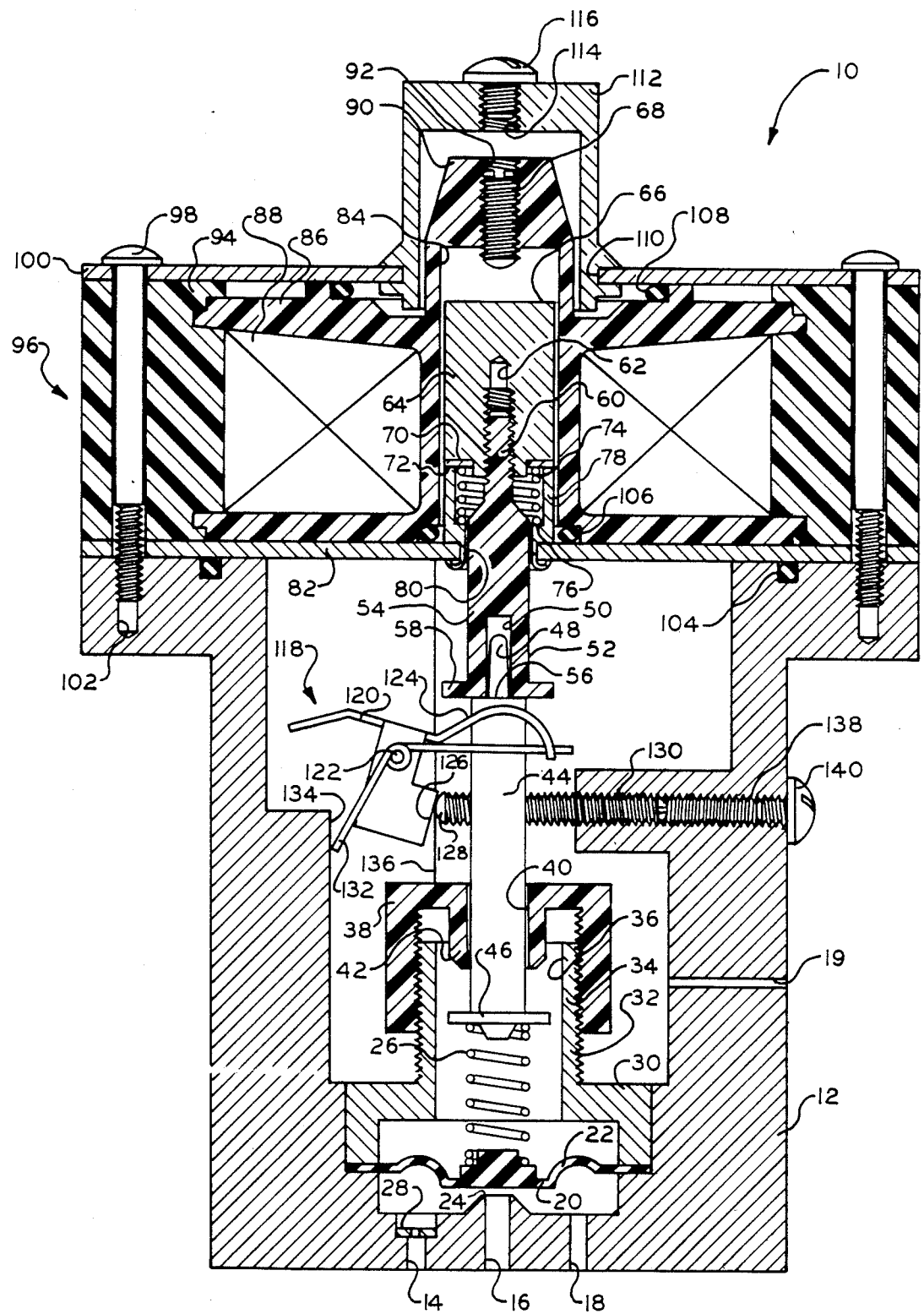
FIG. 4 is a cross-sectional view of the valve shown with the valve at the highest possible pressure setting.

Referring to FIG. 4, the highest possible pressure setting is established when washer 72 at the lower surface 70 of plunger 64 is in contact with core member 78. Under this condition, spring 26 exerts the highest possible bias on valve 20. The value of the highest possible pressure setting is established in the assembly of valve 10. Specifically, lower cover plate 82, core member 78, spring 74, plunger 64, washer 72, and screw member 54 are assembled as a unit. With washer 72 held in contact with core member 78, screw member 54 is adjusted with respect to plunger 64 to obtain a dimension between lower cover plate 82 and flange 58 of screw member 54 which, by design, will provide the desired value, for example, 5.0 inches, for the highest possible pressure setting. Valve 10 is then completely assembled. Adjustment screw 130 is then turned in until the tip portion 128 thereof contacts abutment 136 in the interior wall of valve body 12. Coil 88 is then energized. By design, when adjustment screw 130 is turned in to the point where the tip portion 128 thereof contacts abutment 136, lever 120 is pivoted sufficiently so that with coil 88 energized, forked end 124 of lever 120 is barely in contact with, or preferably, spaced slightly downwardly from flange 58 of screw member 54 as illustrated in FIG. 4. Thus, under this condition, lever 120 does not limit the downward movement of screw member 54, thus enabling washer 72 to contact core member 78. Under this condition, the outlet pressure is checked to verify that it is at the desired highest possible pressure setting value. If the pressure is not at the desired value, it would be because washer 72 is prevented from contacting core member 78 due to lever 120 limiting the downward movement of plunger 64. Should this condition occur, it is correctable by disassembling valve 10 and then adjusting screw member 54 with respect to plunger 64 so as to cause flange 58 of screw member 54 to be moved upwardly a sufficient amount to prevent lever 120 from so limiting the downward movement of plunger 64.

Thus, the highest possible pressure setting exists when washer 72 is in contact with core member 78, and field adjustment of the high fire pressure setting cannot effect a pressure setting higher than such highest setting. The provision of such an upper limit to field adjustment of the high fire pressure setting ensures that the resulting high fire flow rate of gas to the burner will not exceed a rate beyond which combustion might be incomplete.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

I claim:
1. In a fluid pressure regulating valve,
    a valve body having an inlet passage means and an outlet passage means;
    valve means cooperative with a valve seat at one end of said inlet passage means for controlling rate of fluid flow from said inlet passage means to said outlet passage means in response to fluid pressure at outlet means in communication with said outlet passage means;
    spring means for biasing said valve means towards said valve seat;
    a stud having a portion thereon retaining one end of said spring means and having a first axial position for biasing said valve means so as to provide a low fire fluid flow rate;
    solenoid means including an electrical coil, core means, plunger means, and screw means,
    said plunger means and said screw means being coaxial with and cooperative with said stud,
    said electrical coil being cooperative when energized to cause said stud to be moved by said plunger means and said screw means to a second axial position for biasing said valve means so as to provide a high fire fluid flow rate;
    first adjustment means for adjusting the position of said stud when said stud is in said first position so as to adjust the value of said low fire fluid flow rate,
    said first adjustment means including an adjustment screw coaxial with and cooperative with said plunger means so as to enable adjustment of the axial position of said plunger means and thereby of said stud;
    second adjustment means for adjusting the position of said stud when said stud is in said second position so as to adjust the value of said high fire fluid flow rate,
    said second adjustment means including lever means comprising a lever pivotally mounted in said valve body and having an end thereof cooperative with said screw means for limiting axial movement of said screw means and thereby of said stud,
    said second adjustment means further including an adjustment screw cooperative with said lever so as to enable pivotal adjustment of said lever and thereby enable adjustment of said axial position of said stud.

2. The valve claimed in claim 1 further including means for establishing a lower limit to field adjustment of said low fire fluid flow rate comprising an adjustment nut and a cooperative screw means, said adjustment nut having a shank portion thereon coaxial with said spring retaining portion of said stud, said lower limit being established when said spring retaining portion of said stud is in contact with said shank portion of said adjustment nut.

3. The valve claimed in claim 2 wherein said lower limit is factory established by adjusting said adjustment nut with respect to said cooperative screw means to cause said spring retaining portion of said stud to be in contact with said shank portion of said adjustment nut when a desired value of a lowest possible outlet pressure exists at said outlet means.

4. The valve claimed in claim 3 wherein said lower limit is attainable in field adjustment by backing out said adjustment screw of said first adjustment means until said contact of said spring retaining portion of said stud and said shank portion of said adjustment nut occurs.

5. The valve claimed in claim 1 wherein said plunger means and said core means are cooperative for establishing an upper limit to field adjustment of said high fire fluid flow rate, said upper limit being established when said plunger means is in contact with said core means.

6. The valve claimed in claim 5 wherein said plunger means and said screw means are threadedly connected, and wherein said upper limit is factory established by adjusting said screw means with respect to said plunger means to cause said plunger means to be in contact with said core means when a desired value of a highest possible outlet pressure exists at said outlet means.

7. The valve claimed in claim 6 wherein said upper limit is attainable in field adjustment by turning in said adjustment screw of said second adjustment means until said contact of said plunger means and said core means occurs.

* * * * *